Jan. 1, 1952 — A. H. CORFIELD ET AL — 2,581,078
SAFETY DEVICE FOR AIRCRAFT
Filed Dec. 11, 1944 — 5 Sheets-Sheet 1
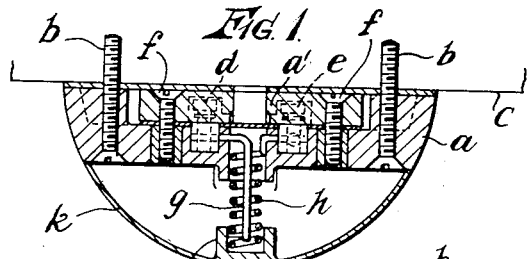
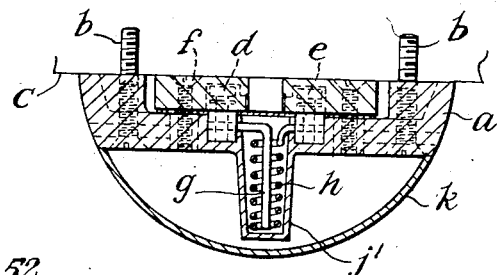
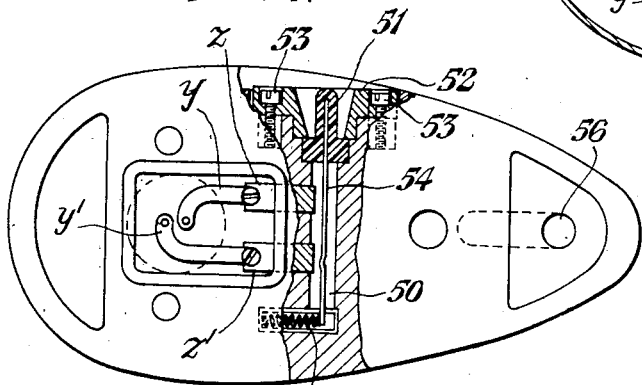
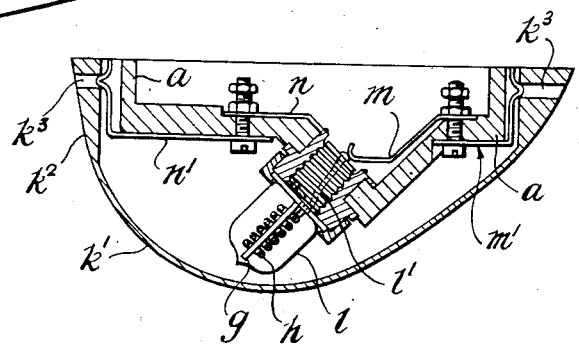
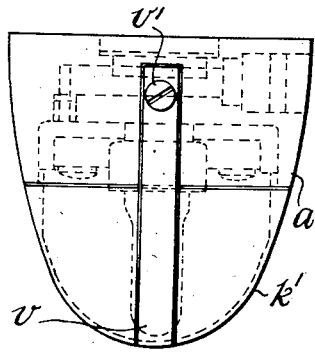
Inventors
Albert H. Corfield,
Edward E. Chapman
by Sommers - Young
Attorneys

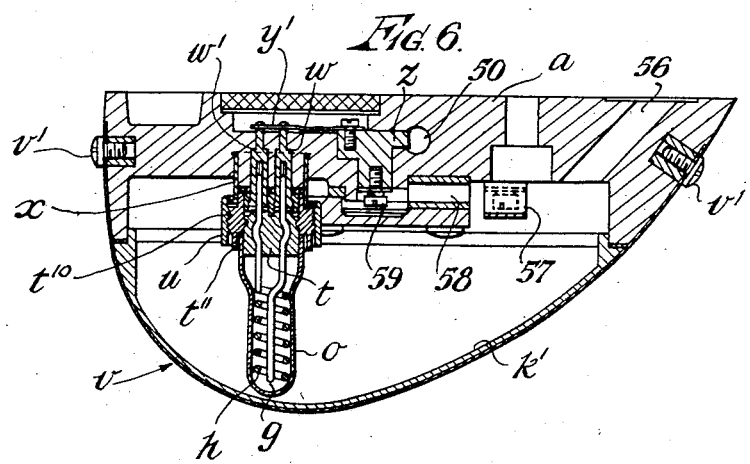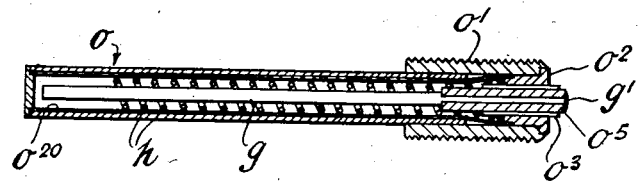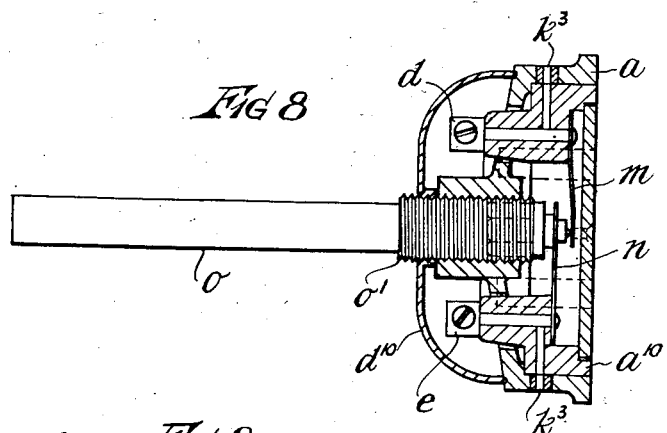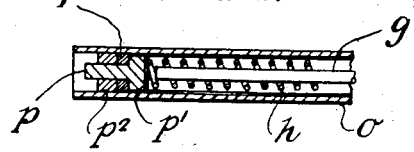

Jan. 1, 1952     A. H. CORFIELD ET AL     2,581,078
SAFETY DEVICE FOR AIRCRAFT
Filed Dec. 11, 1944                                                     5 Sheets-Sheet 3
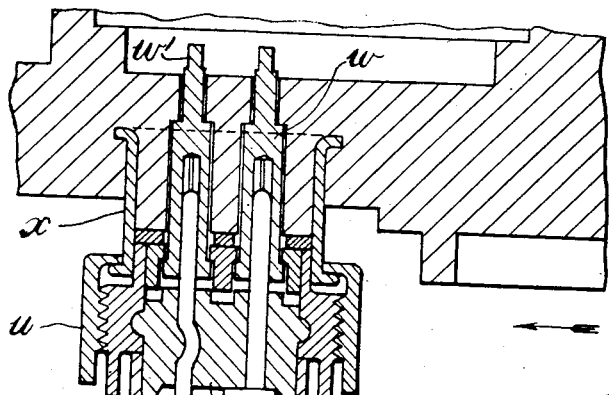
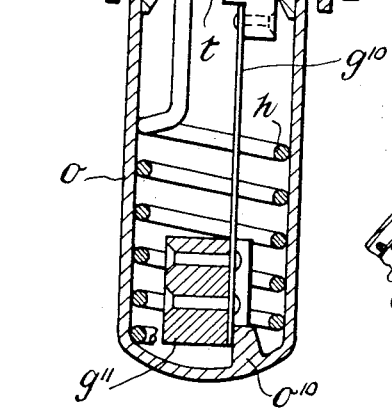
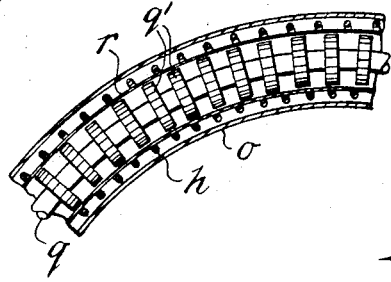
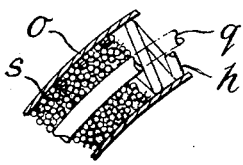
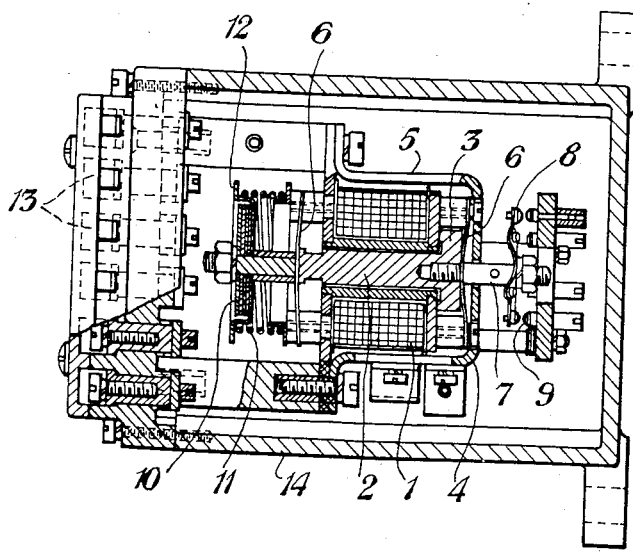
Inventors
Albert H. Corfield,
Edward E. Chapman
by Sommers + Young
Attorneys Jan. 1, 1952     A. H. CORFIELD ET AL     2,581,078
SAFETY DEVICE FOR AIRCRAFT
Filed Dec. 11, 1944     5 Sheets-Sheet 4
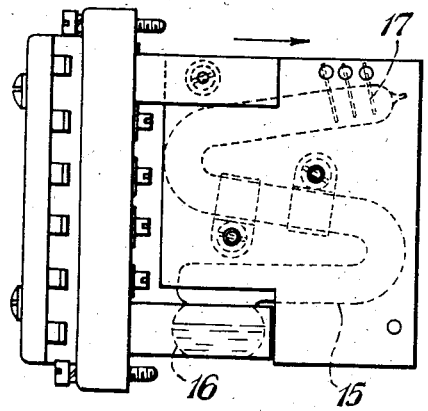
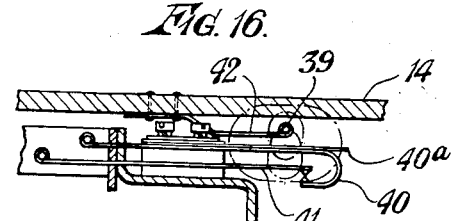
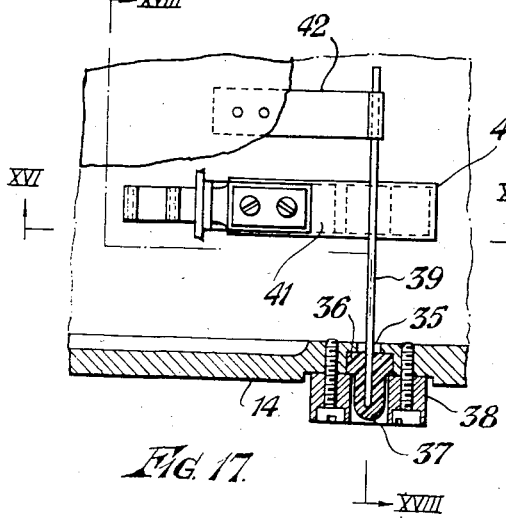
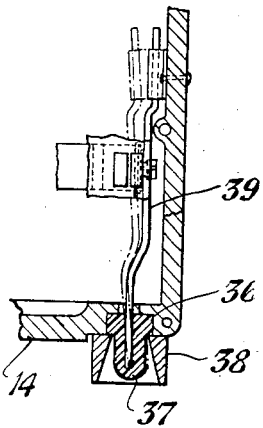
Inventors
Albert H. Corfield,
Edward E. Chapman
by Sommers & Young
Attorneys

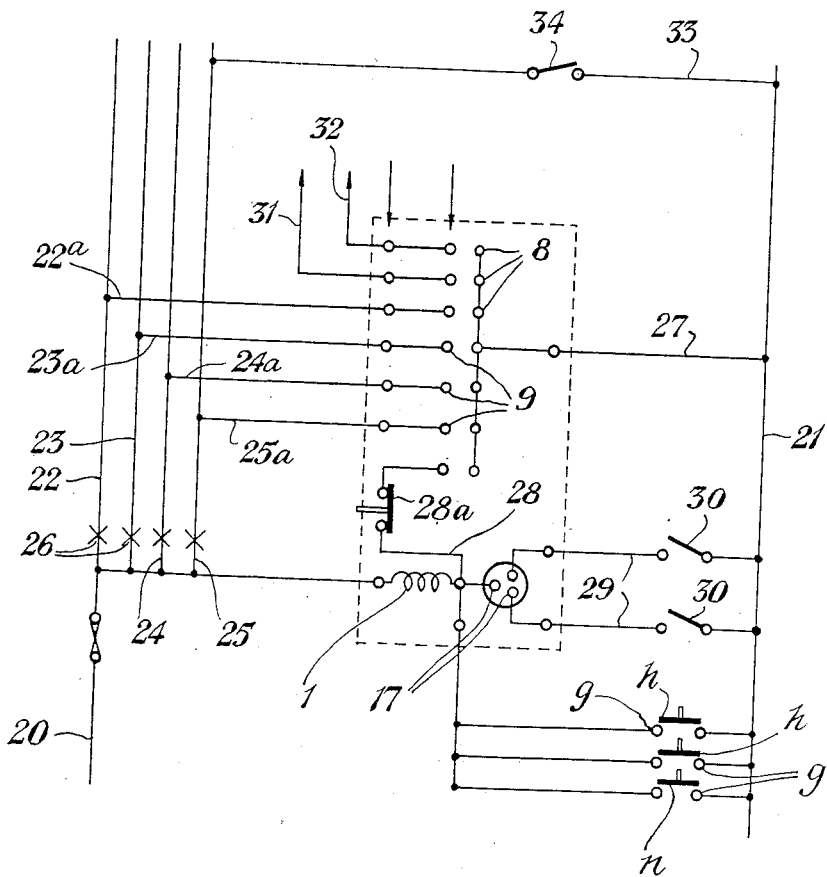

Patented Jan. 1, 1952

2,581,078

UNITED STATES PATENT OFFICE 2,581,078

SAFETY DEVICE FOR AIRCRAFT

Albert Henry Corfield, Sidcup, and Edward Ernest Chapman, Deptford, England, assignors, by mesne assignments, to Cathodeon Limited, Engineers, Cambridge, England, a British joint-stock company Application December 11, 1944, Serial No. 567,700
In Great Britain November 4, 1943

4 Claims. (Cl. 200—52)

This invention comprises improvements in and connected with safety or protective means for aircraft of the kind wherein operation of electrically controlled fire-fighting or prevention devices is initiated by crash-detector devices comprising electrodes or contact devices in the control circuit.

Heretofore, fire-fighting equipment has been installed at various stations on aircraft and under both manual and automatic controls. For example, by operating an appropriate one of several switches, the pilot has been able to put into action an extinguisher at any one of the engine stations, in the event of the engine at that station being involved, or likely to be involved, in a fire. In addition, one or more inertia-operated contact devices has been provided which, upon a crash landing taking place, closed the control circuit and initiated operation of the fire-fighting or extinguishing means at all stations.

The contact device or devices must not be operated by, for example, a bumpy landing or ordinary shocks incidental to rough flights or aerobatics. On the other hand, even a pancake or shockless landing on soft earth may result in dangerous conditions, as for example, if an engine is wrecked due to its propeller being embedded. Accordingly, one object of the present improvements is to provide reliable crash-detector means which will come into action automatically, whenever a crash occurs, irrespective of the nature of the landing.

According to this invention, provision is made of a crash-detector device comprising an outer electrode, such as a coil electrode, an inner electrode, such as a straight rod electrode, surrounded by the outer electrode, and a deformable or frangible rigid enclosure normally protecting the electrodes, the enclosure being devised so that it will break or permanently deform in the event of a crash and cause or permit contact between the electrodes. The enclosure is arranged to afford support to the outer electrode or to restrain movement of the outer electrode into contact with the inner electrode.

The detector is thus made operative through being affected directly by crash conditions, the enclosure being mounted so that it will become broken or permanently distorted upon the occurrence of a crash and by its breakage or distortion will cause or permit the electrodes to make contact with one another. On any aeroplane there would usually be several of these detectors, fitted at different points, for instance at the nose of the fuselage and at suitable points on the wings or at engine stations. On large planes, such as bombers, larger numbers of such detectors would be fitted and distributed so that all vulnerable points are covered. A detector may be mounted so that it stands out from the surface of the aircraft part to which it is affixed, or it may be mounted flush in the external surface or may be mounted inside the aircraft structure and operated by the deformation or breakage of that structure.

In order to enable the invention to be readily understood, reference is made to the accompanying drawings, wherein:

Figure 1 is a central vertical section of one form of crash detector in accordance with the present improvements.

Figure 2 is a vertical section of a modified device somewhat similar to Figure 1.

Figure 3 is a vertical section of a further modification.

Figure 4 is a plan section, Figure 5 is an end elevation and Figure 6 is a vertical section of yet another modified form of crash detector.

Figure 7 is a central longitudinal section of a tubular form of crash detector.

Figure 8 is a sectional elevation illustrating the mounting in a holder of the detector seen in Figure 7.

Figure 9 is a longitudinal section of a modified tubular construction.

Figure 10 is a longitudinal section and Figure 11 is a cross section of a bent tubular detector.

Figure 12 is a longitudinal section of a modification of the construction seen in Figures 10 and 11.

Figure 13 is a central vertical section of yet another modification of the tubular detector.

Figure 14 is a sectional elevation of an enclosed relay switch for use in connection with the crash detectors of these improvements.

Figure 15 is an elevation of an auxiliary mercury switch.

Figure 16 is a fragmental plan section, Figure 17 is a fragmental sectional side elevation and Figure 18 is a sectional end elevational showing a cut-out switch adapted for embodiment in the relay box seen in Figure 14, and Figure 19 is a schematic wiring diagram.

Referring to Figure 1, the crash detector thereof illustrated comprises a base block $a$ affixable by screws $b$ to the surface of an aeroplane part $c$. The base block $a$ is hollowed out to receive two terminal fittings $d$ and $e$. These latter are covered water-tightly by a cover $a^1$ seated on a rubber gasket or the like and fixed by screws $f$.

To the fitting $d$ there is attached a bent rod electrode $g$ which is disposed so as mainly to extend perpendicularly to the surface of the part $c$ and which may be made, for example, of silver-plated phosphor-bronze. To the terminal fitting $e$ there is attached a second electrode $h$ of similar material but in the form of a helically coiled rod or wire. This coil electrode $h$ is arranged so as to enclose the rod electrode $g$ with clearance, as shown. Thus, normally the two electrodes $g$ and $h$ are spaced apart and out of contact with one another. To preserve this normal disposition, the free end of the coil electrode $h$ may be received in a cup $j$ formed within a suitably curved and shaped cover $k$ fitted on to the base $a$ so as to enclose and protect the electrodes $g$, $h$. The cover $k$ is made of thin or frangible material, so that, in the event of a crash, it is certain to be smashed, broken or distorted whereupon the coil electrode $h$ will be forced or permitted to make contact with the rod electrode $g$. This making of contact between the two electrodes $g$ and $h$ is effective for the purpose of initiating safety measures as hereinafter described. If the cover $k$ is produced from a material such as synthetic plastic material or glass, it may be moulded with lugs or with a flange for enabling it to be fixed to the base $a$, or it may be secured to the base by means of a strap as hereinafter described with reference to one of the modifications. The cable containing conductors for connecting the electrodes in the appropriate control circuit is brought through the central hole in the cover $a^1$ and the conductors are then inserted through lateral holes to respective terminals $d$ and $e$. Watertightness around the cable entry is achieved, for example, by the use of a rubber plug surrounding the cable and pressed into the hole in the cover $a^1$.

According to the modification illustrated in Figure 2, the cup $j$ of Figure 1 is replaced by a thin breakable or deformable thimble $j^1$ which closely encloses the coil electrode $h$, this thimble $j^1$ being integral with the base $a$ which may be moulded from synthetic palstic material. The operation of this modified crash detector is the same as that described with reference to Figure 1, for a crash will do away with the cover $k$ and thimble $j^1$ as it would do with the cover $k$ and cup $j$.

The electrodes $g$ and $h$ may be enclosed in a bulb $l$ as seen in Figure 3, the bulb being adapted for being fixed in the base $a$ as by screwing in the plug part $l^1$ of the bulb, as shown. The terminals of the electrodes $g$, $h$ in the said plug engage resilient contacts $m$ and $n$ for connecting up the electrodes, as will be readily understood. In the arrangement illustrated, the resilient contact $m$ engages a contact or pip on the end of the plug and the pip is connected to the electrode $h$, while the resilient contact $n$ engages the socket into which the metal shell of the plug is screwed.

The bulb $l$ may be screwed in at an angle less than a right angle so that it can be enclosed by a stream-lined cover $k^1$ for offering minimum resistance to the air current during flight. The cover $k^1$ may be moulded with a thickened rim $k^2$ for enabling it to be attached to the base. In the rim there may be formed holes $k^3$ giving access to spring contacts $m^1$ and $n^1$ connected respectively with the resilient terminal contacts $m$ and $n$ of the electrodes $g$ and $h$. By inserting in each of these holes $k^3$ one of a pair of needles connected together by a conductor, the control circuit can be completed for test purposes without disturbing the electrodes $g$ and $h$.

In Figures 4 to 6 the cover $k^1$ is similar to that seen in Figure 3 and its stream-lined shape can be seen when examining Figures 4 to 6 collectively. In this modification, however, the cover $k^1$ is moulded with a shallow groove to receive a metal strap $v$, Figures 5 and 6, which is fixed at its ends by screws $v^1$ to the base $a$. The strap $v$ thus forms a simple but very secure means of attachment for the cover $k^1$. Further, in this modification the electrodes $g$ and $h$ are enclosed within a tubular form of bulb $o$ and extend through a plug $t$ closing the open end of the bulb. These extensions of the electrodes are insertable into terminal sockets $ww^1$ in the base $a$, the bulb device being secured by a coupling nut $u$ with a socket $x$ depending from the base $a$. The coupling nut $u$ screws on to a sleeve $t^{10}$ in which the plug $t$ is fixedly engaged and the lower end of the sleeve $t^{10}$ may be formed with tongues $t^{11}$ one of which can be bent up to engage in a castellation in the lower end of the nut $u$ for locking purposes. The sockets $ww^1$ are connected by connectors $yy^1$ with respective terminal blocks $zz^1$ embedded in the base $a$. There is formed, transversely of the base a hole 50 into which the ends of the blocks $zz^1$ protrude as seen clearly in Figures 4 and 6. The mouth of the hole 50 is enlarged to receive the flanged end of a rubber knob or handle 51 and is further enlarged to receive a socket 52 secured therein by screws 53, Figure 4, and holding the flanged end of the knob 51 water-tightly within its recess. A somewhat flexible rod 54 which has one end embedded in the knob 51, extends along the hole 50 and is normally kept away from the protruding ends of the blocks $zz^1$ by a small spring 55. For test purposes, the knob 51 can be rocked within the socket 52 without breaking the watertight joint but so as to deflect or bow the rod 54 so that it makes contact with the blocks $zz^1$, thereby completing the control circuit without disturbing the electrodes $g$ and $h$. The conductors for connecting the electrodes $g$ and $h$ are brought through a hole 56 in the base $a$, passed behind clips 57, Figure 6, and through holes 58 to terminal screws 59 on the blocks $zz^1$.

In Figure 7 the two electrodes $g$ and $h$ are contained within a tube $o$ of greater length than the tubular bulb $o$ of Figure 6. The tube $o$ in Figure 7 may be of brass or ductile metal so as to be stiff enough to resist impacts likely to be met with in ordinary usage but so as to be readily deformable, in the event of a crash, to cause the electrodes $g$ and $h$ to make contact with one another. In the example illustrated, one end of the tube, which latter is lined with insulating material $o^{20}$, is fixed in a screwed metal socket $o^1$, the mouth of the socket being closed by an insulating bush $o^2$. The coil electrode $h$ is fixed to a contact sleeve $o^3$. Inside the contact sleeve $o^3$ is an insulating sleeve $o^5$ which is fitted over a reduced end portion of the rod electrode $g$ terminating in a contact pip $g^1$.

Figure 8 shows this detector screwed into a metal base $a$ which is, in turn, fixed to the aircraft structure. Contained in this metal base and fixed to it is an insulating member $a^{10}$ containing the terminals $d$, $e$ and resilient contacts $m$, $n$ for engaging with the contacts $g^1$ and $o^3$ on the detector. The terminal cover $d^{10}$ screws on to the sleeve $o^1$ of the detector.

To facilitate routine testing of the safety equipment on the aircraft the base $a$ and insulating member $a^{10}$ are formed with small holes $k^3$, insulating bushes being provided in the base $a$. For testing purposes two needles which are electrically connected together by a flexible conductor are inserted into the holes in the manner already described with reference to Figure 3.

The tubular form of crash detector in Figures 7 and 8 would be suitable for mounting on the wing tips of aircraft to ensure immediate operation in the event of either wing tip touching the ground first. Moreover, this form may have an advantage in that distortion of the tube, which would occur during the interval between the detector touching the ground and the wing tip touching the ground, would be of sufficient duration for ensuring contact between the electrodes and operation of a relay before the occurrence of a smash which might put the transmission from the detector to the relay out of action.

An alternative arrangement to facilitate testing is shown in Figure 9. Referring to this illustration an insulating push button $p$ is fitted with a contact plate $p^1$ so that when the push button $p$ is pressed to the right in the illustration against the force of the electrode $h$ acting as a spring, contact is made between the electrodes $h$ and $g$ by means of the contact plate $p^1$. The push button $p$ is guided by means of the part $p^2$ which is fixed in the end of the tube, and a rubber washer $p^3$ is fitted to prevent the ingress of water and dust to the inside of the tube.

A tubular detector may be constructed with a curved formation, as shown in Figures 10 to 12, or may be of such flexibility as will permit of its being bent to a curved form, and such a detector may be fitted around a curved wing tip or edge and just within the skin or outer covering so as to avoid any deformation of the aerofoil shape. In Figures 10 and 11, the bent tubular detector comprises a central flexible electrode wire $q$ having small beads or discs $q^1$, of copper or other suitable material, with toothed peripheries strung upon it and brazed or welded in position. The beads or discs $q^1$ are surrounded by a thin tube $r$ of flexible insulating material and a coil electrode $h$ surrounds the insulation $r$, the assemblage being enclosed in the tube $o$ of flexible insulating material. This tubular device can be bent to reasonable curvature without rupture of the insulation $r$ separating the electrodes $qq^1$ and $h$. A crash, however, produces such deformation as will cause the teeth on the discs $q^1$ to penetrate the insulation $r$ and make contact with the coil electrode $h$. Alternatively, and as shown in Figure 12, the wire or rod electrode $q$ may be encircled by insulation beads $s$ or the like of an insulating material, such as certain kinds of glass, which will pulverize under shock and permit the electrodes $q$ and $h$ to make contact with one another when distortion occurs.

Figure 13 illustrates a modification of the detector described with reference to Figure 6. According to the modification the rod electrode $g^{10}$ takes the form of an elastic metal strip or spring blade having a small weight $g^{11}$ attached at its lower extremity. The strip or spring blade is given a set so that its springiness normally holds the weight $g^{11}$ against a stop $o^{10}$ on the interior of the tubular enclosure $o$ which may be made of a synthetic plastic material and have the stop $o^{10}$ integrally moulded within it. Thus, normally the weight $g^{11}$ is held by the spring action out of contact with the coil electrode $h$ but upon the occurrence of a crash, and with the aircraft travelling in the direction of the arrow, the weight $g^{11}$, due to its inertia, may be moved away from its stop and against the electrode $h$ so as to make the control circuit even before distortion or deformation of the tubular enclosure $o$ may bring this about. It will be appreciated that in this modification, the inertia weight is used only as an additional safeguard and not as a substitute for the making of contact between the two electrodes under crash conditions as hereinbefore described.

A relay device for connection with any one of the crash detectors hereinbefore described is illustrated in Figure 14, wherein 1 is the coil of a magnet or solenoid the circuit of which is to be made by the coming into contact of the two electrodes of the crash detector. In the example illustrated the magnet is not strictly of the solenoid type but the core or plunger 2 is formed with a disc armature 3 which is attracted by an annular pole 4 provided by forming a hole in a magnetic shell 5 enclosing the relay magnet. The core 2 is mounted on thin diaphragm springs 6 so that it is axially movable without sliding friction. At one end, the core 2 is fitted with a rod 7 carrying a number of contacts 8 for engaging with similarly disposed fixed contacts 9 when the relay switch operates. This type of relay may also be arranged to operate as an inertia switch as an additional safety precaution in the event of a heavy crash. Such inertia operation may be obtained in the case of the relay described by adjustment of weight of the moving parts of the relay in relation to the strength of a spring 11. For example, disc weights 10 may be fitted on a rod extending from the rear end of the core 2. Thus, at a predetermined value of retardation the inertia force acting on the moving parts is sufficient to cause the contacts to close against the force of the spring 11, which operates between the magnet frame and an abutment disc 12 on the said rod.

It will be obvious that with the combined arrangement of crash detector and inertia switch, the inertia switch may be set to operate at a reasonably high value of retardation so that there is no risk of the equipment operating inadvertently due to the normal shocks obtaining during landing and taking off or due to aerobatics. Such freedom from inadvertent operation is of the greatest importance as the safety equipment may be such as to stop the main propelling engines and thus deprive the aircraft of its motive power.

Means are provided for retaining the relay switch in the closed position once the magnet has operated to close the contacts 8 against the contacts 9. This is conveniently done by using a pair of these contacts for the closure of an alternative circuit for the coil 1, so that the coil 1 remains energized even if the circuit closed by the electrodes of the detector should be broken. Terminals 13 enable the leads from the various detectors to be connected with the relay and 14 is a box hermetically enclosing the relay switch. Such an enclosure is necessary in order that the parts shall not be liable to corrosion and icing up under atmospheric influences.

As a safeguard to cover for the somewhat remote possibility of the aircraft gently turning over on its back without causing a sufficient forward retardation to operate the relay and without causing the crash detectors to operate, an additional turnover switch illustrated in Figure 15 may be fitted at one side of the box 14, Figure 14. This switch consists of a Z-shaped glass tube 15 having at its lower extremity an enlargement 16 which normally contains mercury, as indicated, when the aircraft is on an even keel. The shape of the tube 15 prevents any possibility of the mercury splashing up to contacts 17 at the other end of the tube. In the event of the aircraft travelling in the direction of the arrow and turning over, however, it will be seen that the mercury will run down the tube and form a connection between the contacts 17, thereby bringing the relay into operation. The contacts 17 may be arranged in series with switches operated by the retractable undercarriage of the aircraft, so that the operation of the mercury switch will not be effective should the aircraft fly in an upside down position with the undercarriage retracted.

In view of the provision made as above described for a pair of the contacts 8 and 9 to close an alternative circuit of the relay coil 1 it is necessary to provide a switch device for enabling the circuit of the coil 1 to be reopened after it has been closed for test purposes, for example. Such a switch device may be conveniently installed in the box 14 hermetically closing the relay switch as described with reference to Figure 14. For example and with reference to Figures 16 to 18, the floor of the box 14 at one side may be formed with a hole 35 and a recess surrounding the hole and adapted for the close reception of the flange 36 of a rubber button 37. The flange is secured with a gas tight joint in the recess by means of a brass ring 38 fastened by screws to the bottom of the box 14, the said ring 38 surrounding the button 37 to protect it. The rubber button 37 and its flange 36 are moulded to one end of a Phosphor bronze rod 39 extending up into the box and normally held away from resilient contact blades 40 and 41 by the leaf spring 42, the contact blades 40 and 41 being in the said alternative circuit. The hole in the ring 38 is elliptical so that the button can be tilted to a certain extent in one direction within the hole. Thus, when the apparatus is tested and the relay coil 1, Figure 14, is brought into action, the test may be ended by tilting the button 37 as indicated in dotted lines in Figure 18, so as to press the rod 39 against the contact blade 40, and flex the latter, thereby causing it to break contact with the contact blade 41. The blade 40 is provided with an insulation layer 40a to prevent electrical contact between such blade and the rod 39. The rubber button device 36, 37, preserves at all times and under all conditions the gas-tight closure of the box 14 and operation of such button may be effected, if desired, by the aid of a lever or key device adapted for being engaged with the button 37. The hold-on characteristic of the relay magnet, that is to say its ability to remain energized and hold the relay contacts 8 and 9 closed even although engagement of the electrodes of a crash detector may have been only momentary, can be attained by other known means and may even be due to a mechanical latch device adapted for positively locking the relay switch, once the latter has moved to the closed position.

Referring to the circuit diagram, Figure 19, it will be seen that the several crash detectors g, h are connected in parallel with one another, and in series with the coil 1 of the relay switch, across the positive and negative main conductors 20, 21. Thus, the operation of any one of the detectors g, h in the manner hereinbefore described is effective for causing the relay magnet coil 1 to be energized. Leads 22, 23, 24 and 25 from the positive main 20 form part of the fire-fighting circuits and each includes some electrical means 26 for the putting into operation of suitable fire extinguishers. Each of the said leads is connected by a conductor 22a, 23a, 24a, or 25a with an appropriate one of the fixed contacts 9 of the relay switch. The movable contacts 8 of the relay switch are connected by conductor 27 with the negative main 21. One terminal of the relay coil 1 is connected by a conductor 28, which includes a normally closed switch 28a, with one of the fixed contacts 9 of the relay switch. The switch 28a may be assumed to be that which has been described with reference to Figures 16 to 18. The said terminal of the relay coil 1 is also connected with one of the contacts 17 of the turn-over switch described with reference to Figure 15, the two other contacts 17 of this switch being connected by conductors 29 with the negative main, each of the conductors 29 including an undercarriage switch 30. When the undercarriage is up, the switches 30 are open so that the turnover switch cannot function but if the undercarriage is down the switches 30 are closed. Thus, in the event of the aircraft overturning with the undercarriage down, the mercury makes connection between the contacts 17 so that the circuit of the relay coil 1 is made. Circuits 31 and 32 are shown connected with respective fixed contacts 9 of the relay switch and one of these may include a battery cut-out whilst the other may include a spare fire-fighting device. The lead 25 is shown to be connected by a conductor 33 with the negative main, a press button switch 34 normally opening circuit through the conductor 33. Each of the leads 22, 23 and 24 may be similarly connected in which case closure of the press button switch 34 in the respective circuit will bring into action a respective fire-fighting device 26. In the event of a crash, the electrodes g, h of one or other of the crash detectors will make contact with one another and complete the circuit of the relay coil 1. The energizing of the relay magnet then brings the movable contacts 8 hard against the fixed contacts 9 so as to complete the circuits of the fire fighting devices 26. Moreover, one of the movable contacts engages a fixed contact connected with the conductor 28 and thereby makes an alternative circuit of the relay coil 1 by way of conductor 28 including switch 28a, contacts 9 and 8 and conductor 27 to the negative main. Thus, the relay coil 1 will remain active even if the electrodes g, h of a crash detector should only momentarily make contact with one another, because once the contacts 8 have closed against the contacts 9 the relay coil circuit will be completed by the alternative route so long as the switch 28a remains closed. It will now be apparent that operation of any one of the crash detectors g, h is effective for bringing into operation all of the fire fighting devices 26. Only three detectors and four fire-fighting devices are indicated in the diagram but it will be apparent that any number of detectors and any number of fire-fighting devices can be connected in the manner illustrated.

The box 14, Figure 14, may be provided with a small charge of hygroscopic material, such as silica gel, in order to keep the interior dry and prevent condensation of moisture under all climatic conditions.

The fire fighting circuits to be controlled by the relay may consist of bottles of suitable fire extinguishing fluid or other material which is caused to be discharged into the engine and also on to the hot parts of the engine or exhaust system, in order to cool down those parts very rapidly. It is probable that an aircraft would be equipped with a separate installation of bottles of this type for each engine. Moreover, additional bottles may also be provided for protecting petrol tanks and containers that may be carried at any part of the aircraft. In addition to the operation of this direct fire-prevention means, the relay may also be used to put into operation other fire prevention systems such as, for example, the breaking of the main battery connections to the wiring of the aircraft. This will of course greatly reduce the risk of fires due to sparking and arcing from damaged electrical apparatus and wiring. With such a system it is of course necessary to ensure that there should be a small time delay between the operation of the relay and the breaking of the main battery connections—this can easily be arranged by many well known delay-action means.

Furthermore, the relay may also be made to perform other functions, such as, for example, when used in military aircraft it may be caused to fire the detonators of explosive charges built into secret apparatus so that in the event of a crash such apparatus may be destroyed.

The crash detector, in combination with a relay on the principle described above, will be effective in the prevention or fighting of fires however lightly the aircraft may be crash landed, for example, the aircraft may make a perfect "belly" landing but nevertheless the resulting damage to the engines may be sufficient to cause fires to start under normal circumstances, but even in such a case as this the "crash detectors" would bring various preventative means into operation in a most certain manner.

We claim:

1. In an electrically-controlled fire-fighting installation for aircraft, a crash-detector device comprising an outer casing of frangible material having an elongated tubular form, a rod electrode enclosed within said outer casing and extending substantially coaxially of the casing and for substantially the entire length thereof, a coiled electrode surrounding and spaced from said rod and extending for substantially the full length thereof, the two electrodes being located within said outer casing with a space between said outer coiled electrode and the wall of said frangible outer case less than the space between said coiled electrode and said rod electrode, the arrangement being such that in the event of a crash the outer frangible case will be broken to allow the said coiled electrode to contact said rod electrode.

2. In an electrically-controlled fire-fighting installation for aircraft, a crash-detector device comprising an elongated tubular outer casing of frangible material having two electric contacts at one end for insertion and operable electrical connection of said casing in a socket having complementary electrical contacts, a rod electrode enclosed within said outer casing and connected to one of said first-mentioned electrical contacts and extending substantially coaxially of said casing for substantially the entire length thereof, a coiled electrode surrounding said rod electrode and extending for substantially the full length thereof and connected to a second of said first-mentioned electrical contacts, a space between said coiled electrode and the wall of said outer casing and a space between said coiled electrode and said rod electrode, the space between said coiled electrode and said wall being less than the space between said coiled electrode and said rod.

3. A crash detector device as claimed in claim 1, wherein the enclosure for the electrodes has an open outer end and contains a slidable plug adapted for effecting contact between said coiled electrode and said rod electrode when said plug is forced inwardly of the tube.

4. A crash-detector device as claimed in claim 1, wherein the inner electrode is flexible and fitted at its free end with an inertia weight.

ALBERT HENRY CORFIELD.
EDWARD ERNEST CHAPMAN.

REFERENCES CITED

The following references are of record in the file of this patent:

UNITED STATES PATENTS

| Number | Name | Date |
|---|---|---|
| 1,171,850 | Klein | Feb. 15, 1916 |
| 1,200,339 | Graham et al. | Oct. 3, 1916 |
| 1,223,866 | Graham et al. | Apr. 24, 1917 |
| 1,576,950 | Conklin | Mar. 16, 1926 |
| 1,800,259 | Mayrshofer | Apr. 14, 1931 |
| 1,835,916 | Vickery | Dec. 8, 1931 |
| 2,137,395 | Erich | Nov. 22, 1938 |
| 2,145,543 | Gross | Jan. 31, 1939 |
| 2,189,147 | Mathisen | Feb. 6, 1940 |
| 2,208,697 | Kernodle et al. | July 23, 1940 |
| 2,251,568 | Gustin et al. | Aug. 5, 1941 |
| 2,284,103 | Smitley | May 26, 1942 |
| 2,333,210 | Stern | Nov. 2, 1943 |
| 2,352,692 | Dann | July 4, 1944 |
| 2,414,912 | Wiatt | Jan. 28, 1947 |

FOREIGN PATENTS

| Number | Country | Date |
|---|---|---|
| 11,617 | Great Britain | May 28, 1896 |
| 224,705 | Great Britain | Nov. 20, 1924 |
| 247,961 | Great Britain | June 17, 1927 |